United States Patent [19]

Tertinek

[11] 3,878,733
[45] Apr. 22, 1975

[54] COMPACTOR WITH DIRECTIONAL CONTROL FOR ECCENTRIC WEIGHTS

[75] Inventor: Christian T. Tertinek, Canandaigua, N.Y.

[73] Assignee: Stone Construction Equipment, Inc., Honeoye, N.Y.

[22] Filed: Jan. 15, 1974

[21] Appl. No.: 433,468

[52] U.S. Cl. .................... 74/61; 404/113; 404/133
[51] Int. Cl. ......................................... F16h 33/00
[58] Field of Search ............ 74/61, 64, 87; 404/113, 404/133

[56] References Cited
UNITED STATES PATENTS

| | | | |
|---|---|---|---|
| 2,223,024 | 11/1940 | Beierlein | 74/61 X |
| 2,293,962 | 8/1942 | Baily | 74/61 X |
| 3,001,458 | 9/1961 | Croucher | 404/133 |
| 3,342,118 | 9/1967 | Beierlein | 404/113 |
| 3,814,533 | 6/1974 | Buck | 404/133 |
| 3,832,080 | 8/1974 | Stoecker | 74/61 X |
| R20,663 | 3/1938 | Cameron | 404/113 |

*Primary Examiner*—Samuel Scott
*Assistant Examiner*—Lance W. Chandler
*Attorney, Agent, or Firm*—Clarence A. O'Brien; Harvey B. Jacobson

[57] ABSTRACT

A compactor base is provided and includes a pair of horizontal eccentric shafts journaled therefrom with the shafts paralleling each other and spaced horizontally apart longitudinally of the base. The shafts are provided with matching meshed gear wheels and the gear wheels are keyed to the shafts by means of oppositely convoluted grooves formed in the shafts and key elements carried by the gear wheels slidable in the grooves. The gear wheels are embraced by thrust bearing equipped yoke structure and the yoke structure is supported from the base for shifting axially of the shafts, the latter being provided with eccentrically disposed weights. By this construction the angular displacement of the eccentric weights relative to the axes of rotation of the corresponding shafts may be inversely varied in response to shifting of the yoke structure longitudinally of the shafts and the compactor base will move forward, rearward or merely vibrate in a vertical plane at the discretion of the operator in accordance with the positioning of the yoke axially along the eccentric shafts.

9 Claims, 9 Drawing Figures

Fig. 2-A 3,878,733

COMPACTOR WITH DIRECTIONAL CONTROL FOR ECCENTRIC WEIGHTS

BACKGROUND OF THE INVENTION

Twin eccentric vibrators have heretofore been provided with structure for variably controlling the relative angularity of the eccentrics. Examples of this type of prior art may be found in U.S. Pat. Nos. 3,262,329 to J. Herrmann, dated July 26, 1966, 3,001,458, to A. H. Croucher, dated Sept. 26, 1961, No. 2,410,170 to B. J. Lazan, dated Oct. 29, 1946 and No. 2,223,024 to K. Beierlein, dated Nov. 26, 1940.

However, these previous structures are either relatively complex and require excessive machining and intricate controls or they do not provide for infinitely variably controlling the relative angularity of the two eccentrics throughout the range of adjustment thereof.

It is accordingly the main object of this invention to provide an adjustable eccentric vibrator constructed in a manner whereby the relative angularity of the eccentric weights may be infinitely varied throughout the range of adjustment and whereby the structure for infinitely varying the relative angularity of the eccentric shafts is presented in the most simplified form.

Another object of this invention, in accordance with the immediately preceding object, is to provide an apparatus whose structural components will provide an extended life expectancy due to their simplicity.

A final object of this invention to be specifically enumerated herein is to provide a compactor in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2A is a vertical sectional view taken upon the plane 2A—2A of FIG. 2;

DETAILED DESCRIPTION OF THE PREFERRED EMBODIMENT

Figure 1:
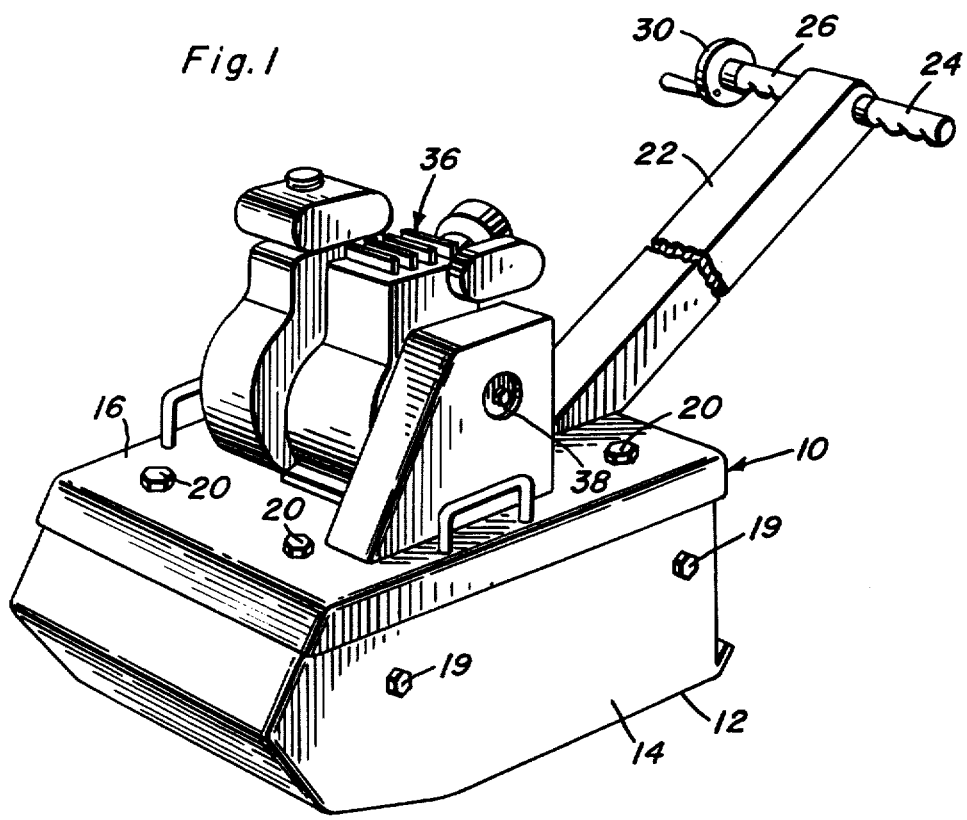
FIG. 1 is a perspective view of a compactor constructed in accordance with the present invention.
Figure 2:
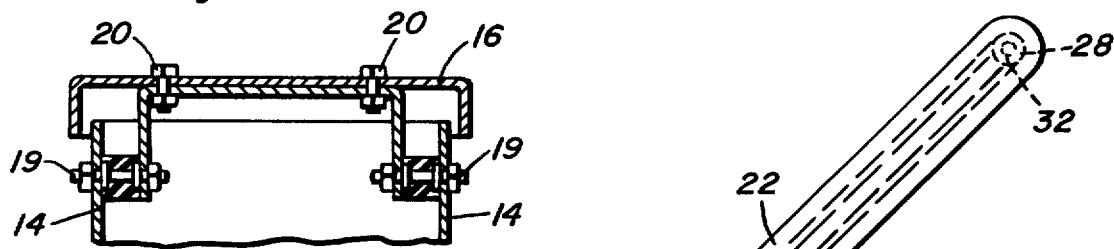
FIG. 2 is a fragmentary longitudinal vertical sectional view taken substantially upon a plane passing through the longitudinal centerline of the compactor illustrated in FIG. 1.
Figure 2:
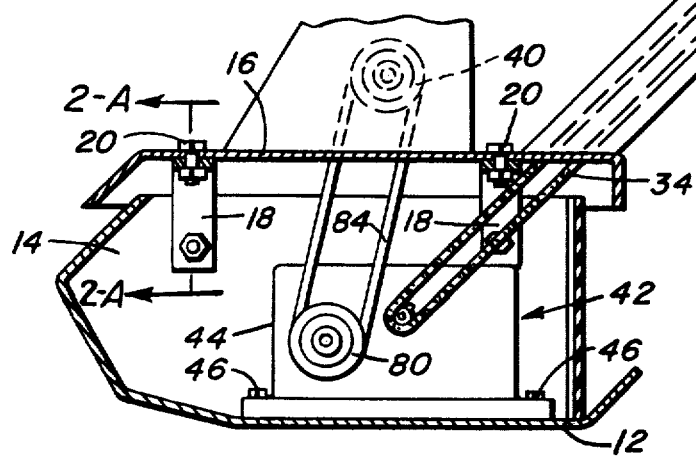
Figure 3:
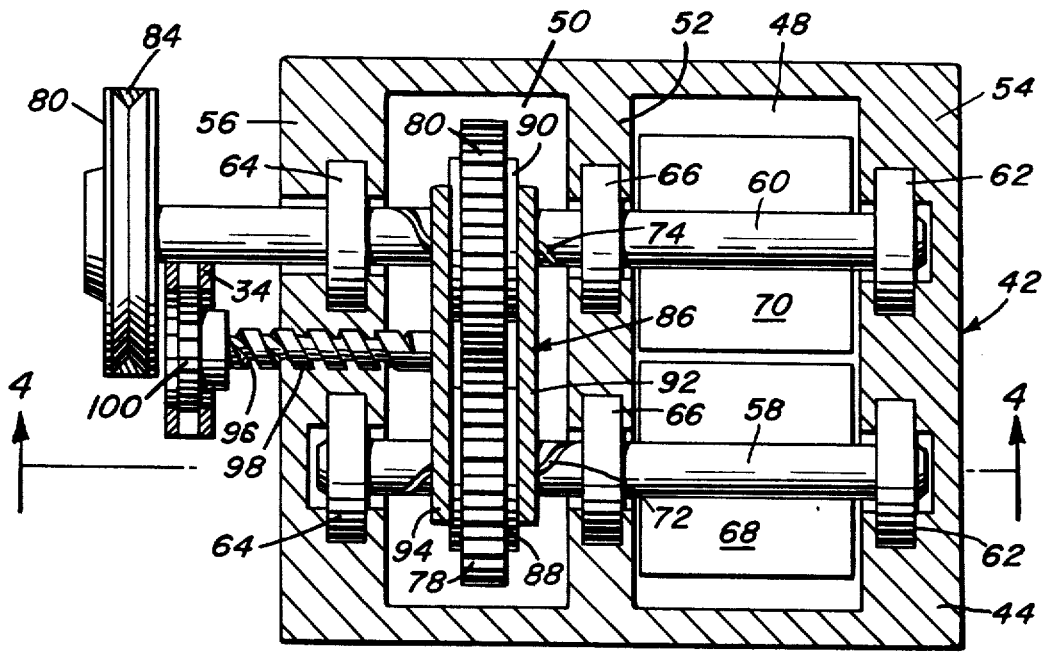
FIG. 3 is an enlarged horizontal sectional view taken substantially upon a plane passing through the vertical center of the eccentric assembly of the compactor.
Figure 4:
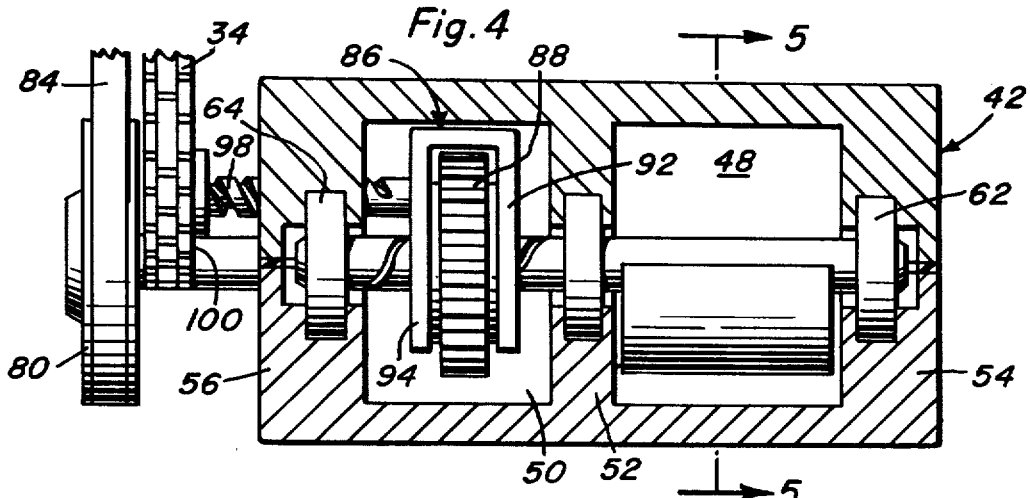
FIG. 4 is a vertical sectional view taken substantially upon the plane indicated by the section line 4—4 of FIG. 3.
Figure 5:
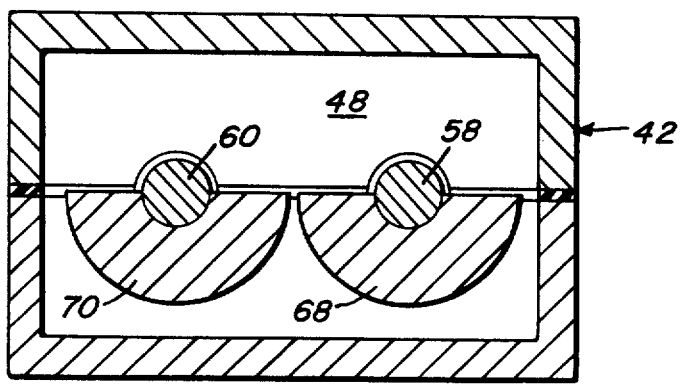
FIG. 5 is a vertical sectional view taken substantially upon the plane indicated by the section line 5—5 of FIG. 4.

With reference now more specifically to the drawings, the numeral 10 generally designates a compactor constructed in accordance with the present invention. The compactor 10 includes a base plate 12 including upstanding opposite sides 14 from whose upper portions the motor support plate 16 of the compactor 10 is supported by means of brackets 18 anchored to the sides 14 and by shock absorbing fasteners 19 and to the motor support plate 16 by means of fasteners 20.

The motor support plate 16 includes a hollow rearwardly and upwardly inclined handle 22 which opens downwardly through the motor support plate 16 and includes opposite side outwardly projecting handgrips 24 and 26 at its upper end. A shaft 28 is rotatably journaled through the handgrip 26 and has a crank 30 mounted on its outer end. A sprocket wheel 32 disposed within the upper end of the handle 22 is mounted on the inner end of the shaft 28 and an endless chain 34 is trained about the sprocket wheel 32 and extends downwardly through the tubular handle 22. However, the chain 34 could be replaced by a flexible cable.

Any suitable prime mover or motor referred to in general by the reference numeral 36 is anchored to the upper surface of the motor support plate 16 in any convenient manner and the motor 36 includes a rotary output shaft 38 upon which a centrifugal clutch including a drive output pulley wheel 40 is mounted.

An eccentric assembly referred to in general by the reference numeral 42 includes a case 44 secured to the base plate 12 by means of fasteners 46 and the interior of the case 44 is divided into a pair of side-by-side compartments 48 and 50 by a central partition 52 in the case 44. The partition 52 is spaced generally equidistant between opposite side walls 54 and 56 of the case 44 and a pair of shafts 58 and 60 have their opposite end portions journaled from the side walls 54 and 56 by means of bearing assemblies 62 and 64, respectively. The mid-portions of the shafts 58 and 60 are journaled from the partition 52 by means of bearing assemblies 66.

Those portions of the shafts 58 and 60 disposed between the partition 52 and the side wall 54 include eccentric weights 68 and 70 and the portions of the shafts 58 and 60 disposed between the partition 52 and the side wall 56 include oppositely convoluted grooves 72 and 74.

A pair of meshed gear wheels 78 and 80 are mounted on the grooved portions of the shafts 58 and 60 and include inwardly projecting tongue portions (not shown) slidably disposed in the grooves 72 and 74. Also, it will be noted that the end of the shaft 60 journaled from the side wall 56 projects through the latter and is equipped with a pulley wheel 80 aligned with the pulley wheel 40 and that an endless belt 84 is trained about the pulley wheels 40 and 80.

A yoke structure referred to in general by the reference numeral 86 is disposed within the compartment 50 and is equipped with thrust bearings 88 and 90 acting upon the gear wheels 78 and 80. The yoke or yoke structure 86 embraces the gear wheels 78 and 80 between opposite side portions 92 and 94 of the yoke between which the thrust bearings 88 and 90 are received and one end of a screw shaft 96 is journaled from the yoke 86 against axial displacement relative thereto. The screw shaft 96 includes a threaded portion 98 thereof which is threaded through the side wall 56 of the case 44 and the outer end of the screw shaft 96 has a sprocket wheel 100 mounted thereon aligned with the sprocket wheel 32 and about which the lower portion of the endless chain 34 is trained.

Figure 6:
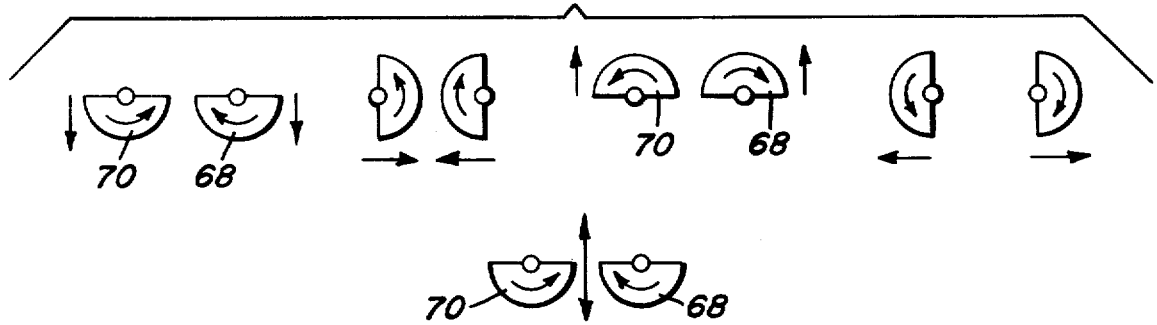
FIG. 6 is a grouping of several schematic views illustrating the direction of forces generated by the eccentric shafts in alternate positions of rotation relative to each other and with the forces generated by the two shafts substantially cancelling each other for stationary use of the compactor.

In operation, and with attention invited more specifically to FIG. 6 of the drawings, when the eccentric weights 68 and 70 are angularly positioned relative to each other in the manner illustrated in the several schematic views of FIG. 6 the centrifugal forces generated by the eccentric weights are in directions of 180° opposite to each other and thus the eccentric assembly 42 carried by the base plate 12 tends to vibrate in a vertical path without any horizontal component. The centrifugal force of the eccentrics 68 and 70 are in opposite horizontal directions but are in like vertical directions and therefore full vibration and compacting force of the base plate 12 occurs in a vertical direction.

Figure 7:
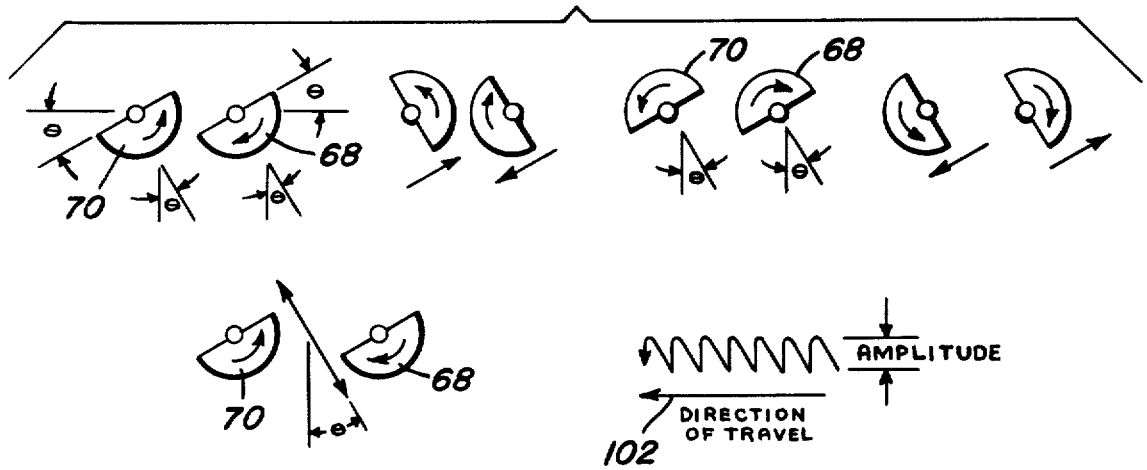
FIG. 7 is a grouping of several schematic views of first relatively angularly adjusted positions of the eccentric shafts in various rotated positions thereof and with the forces generated by the rotating eccentric shafts being such to cause movement of the compactor in a forward direction.

With attention now invited to FIG. 7, when the eccentrics 68 and 70 are angularly displaced relative to each other from the positions thereof illustrated in FIG. 6 to the positions thereof illustrated in FIG. 7 it will be noted that when the centrifugal force of the eccentrics 68 and 70 are in the same directions, these directions are inclined upwardly to the left as viewed in FIG. 7 of the drawings and downwardly to the right as viewed in FIG. 7. Accordingly, the eccentric assembly 42 and base plate 12 tend to be advanced in the direction of the arrow 102 in FIG. 7.

Figure 8:
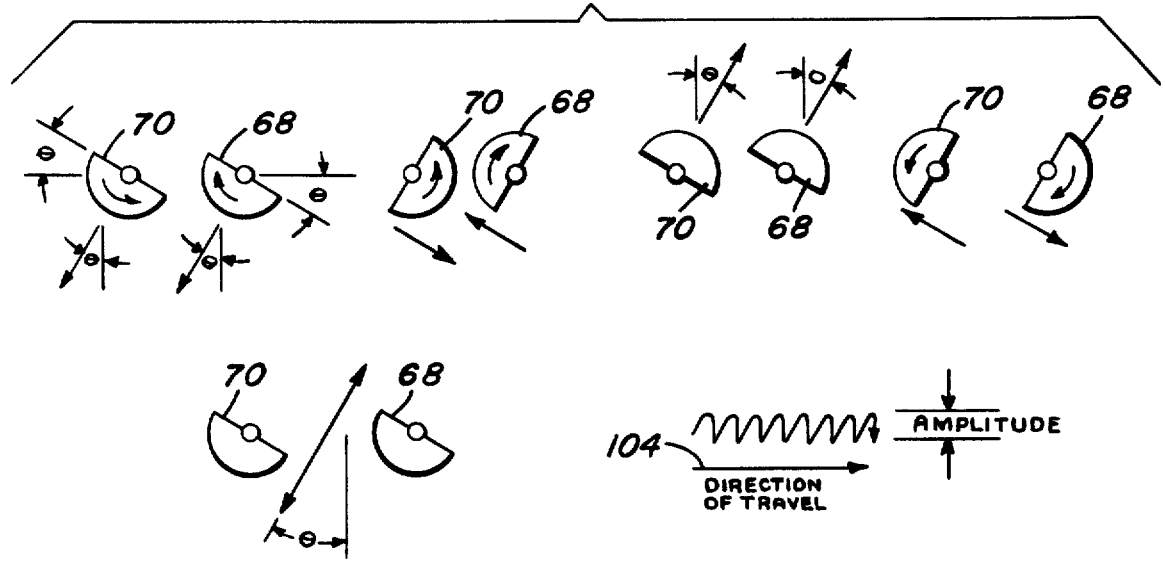
FIG. 8 is a grouping of several schematic views illustrating a further set of relatively angulated positions of the eccentric shafts in various rotated positions thereof with the forces generated thereby serving to cause the compactor to move in a rearward direction.

However, when the eccentric weights 68 and 70 are oppositely angularly adjusted relative to each other from the positions thereof illustrated in FIG. 6 to the positions thereof illustrated in FIG. 8, the common directions of centrifugal forces are in opposite inclined directions upwardly to the right and downwardly to the left as viewed in FIG. 8. Therefore, the eccentric assembly 42 and the base plate 12 tend to move in the direction of the arrow 104.

The eccentric weights 68 and 70 may be relatively angularly adjusted by turning the crank 30 which in turn causes the screw shaft 96 to rotate and be axially shifted relative to the case 44. Thus, the yoke assembly 86 is shifted axially of the shafts 58 and 60. Inasmuch as the gear wheels 78 and 80 may not rotate relative to each other during displacement of the gear wheels 78 and 80 longitudinally of the shafts 58 and 60, the shafts 58 and 60 are caused to rotate in opposite directions relative to each other to thus change the relative angularity of the eccentrics 68 and 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a mounting plate having front and rear ends, a base plate supported below and from said mounting plate for limited vibration of said base plate relative to said mounting plate in an upstanding plane extending longitudinally of said mounting plate, a rearwardly and upwardly inclined tubular handle supported from said opening downwardly through a rear portion of said mounting plate, rotary control means journaled from an upper portion of said handle, a rotary vibrator assembly supported from said base plate beneath said mounting plate and including a rotary input shaft portion, motor means supported from said mounting plate and including a rotary output shaft, means drivingly coupling said output shaft to said rotary input shaft portion, said vibrator assembly including a pair of side by side horizontal shafts journaled for rotation about an axis extending transversely of said base plate and driven from said input shaft portion for simultaneous and equal rotation, weight bodies mounted eccentrically on said shafts, meshed gear wheels mounted on said shafts for adjustable angular displacement relative thereto, weight body angular displacement adjusting means operatively connected between said shafts and gear wheels for angularly adjusting the latter relative to said shafts, said adjustment means including rotary operator means disposed below said mounting plate, and rotary motion transmitting means operatively connecting said rotary control means to said rotary operator for operation of the former in response to rotation of the latter, said rotary motion transmitting means extending downwardly through said handle, said rotary control means including a horizontal transverse rotary shaft portion journaled in the upper portion of said handle and having a first wheel member mounted thereon, said rotary operator means including a horizontal transverse rotary shaft portion having a second wheel member mounted thereon, said motion transmitting means comprising an elongated endless flexible drive member trained about said first and second wheel members.

2. The combination of claim 1 wherein said wheel members comprise sprocket wheels and said endless flexible drive member comprises an endless flexible chain.

3. In combination, a mounting plate having front and rear ends, a base plate supported below and from said mounting plate for limited vibration of said base plate relative to said mounting plate in an upstanding plane extending longitudinally of said mounting plate, a rearwardly and upwardly inclined tubular handle supported from said opening downwardly through a rear portion of said mounting plate, rotary control means journaled from an upper portion of said handle, a rotary vibrator assembly supported from said base plate beneath said mounting plate and including a rotary input shaft portion, motor means supported from said mounting plate and including a rotary output shaft, means drivingly coupling said output shaft to said rotary input shaft portion, said vibrator assembly including a pair of side by side horizontal shafts journaled for rotation about an axis extending transversely of said base plate and driven from said input shaft portion for simultaneous and equal rotation, weight bodies mounted eccentrically on said shafts, meshed gear wheels mounted on said shafts for adjustable angular displacement relative thereto, weight body angular displacement adjusting means operatively connected between said shafts and gear wheels for angularly adjusting the latter relative to said shafts, said adjustment means including rotary operator means disposed below said mounting plate, and rotary motion transmitting means operatively connecting said rotary control means to said rotary operator for operation of the former in response to rotation of the latter, said rotary motion transmitting means extending downwardly through said handle, said shafts including spiral guide means thereon and said gear wheels including portions thereof slidably keyed to the respective spiral guide means, said weight body angular displacement adjustment means including a yoke shiftable along said shafts and operatively connected to said gear wheels for effecting axial shifting thereof in response to shifting of said yoke along said shaft.

4. The combination of claim 3 wherein said rotary operator means is journaled from said yoke for rotation about an axis paralleling said shafts and against axial displacement relative to said yoke, said operator means including a threaded connection with a stationary support portion from which said shafts are journaled.

5. The combination of claim 4 wherein said rotary control means includes a horizontal transverse rotary shaft portion journaled in the upper portion of said handle and having a first wheel member mounted thereon, said rotary operator means including a horizontal transverse rotary shaft portion having a second wheel member mounted thereon, said motion transmitting means comprising an elongated endless flexible drive member trained about said first and second wheel members.

6. In combination, a rotary vibrator assembly including a pair of side-by-side shafts journaled for rotation from a base portion, weight bodies mounted eccentrically on said shafts, meshed gear wheels mounted on said shafts for adjustable angular displacement relative thereto, weight body angular displacement adjustment means operatively connected between said shafts and said gear wheels for angularly adjusting the latter relative to the shafts, said adjustment means including rotary operator means, said shafts including spiral guide means thereon and said gear wheels including portions thereof slidably keyed to the respective guide means, said weight body angular displacement adjustment means including a yoke shiftable along said shafts and operatively connected to said gear wheels for effecting axial shifting thereof in response to shifting of said yoke along said shaft.

7. The combination of claim 6 wherein said rotary operator means is journaled from said yoke for rotation about an axis paralleling said shafts and against axial displacement relative to said yoke, said operator means including a threaded connection with said base portion.

8. The combination of claim 3 wherein said rotary control means includes a horizontal transverse rotary shaft portion journaled in the upper portion of said handle means and having a first wheel member mounted thereon, said rotary operator means including a horizontal transverse rotary shaft portion having a second wheel member mounted thereon, said motion transmitting means comprising an elongated endless flexible drive member trained about said first and second wheel members.

9. The combination of claim 7 including a mounting plate disposed above said base portion and from which the latter is supported for limited vibration relative to said mounting plate, a rearwardly and upwardly inclined tubular handle supported from and opening downwardly through a portion of said mounting plate, rotary control means including a horizontal transverse rotary shaft portion journaled in an upper portion of said handle and having a first wheel member mounted thereon, said rotary operator means including a horizontal transverse rotary shaft portion having a second wheel member mounted thereon, and rotary motion transmitting means comprising an endless flexible drive member trained about said first and second wheel members.

* * * * *